(12) United States Patent
Wang

(10) Patent No.: US 8,665,178 B1
(45) Date of Patent: Mar. 4, 2014

(54) PARTIALLY-REFLECTIVE WAVEGUIDE STACK AND HEADS-UP DISPLAY USING SAME

(75) Inventor: Chia-Jean Wang, Palo Alto, CA (US)

(73) Assignee: Google, Inc., Mountain View, CA (US)

( * ) Notice: Subject to any disclaimer, the term of this patent is extended or adjusted under 35 U.S.C. 154(b) by 134 days.

(21) Appl. No.: 13/410,180

(22) Filed: Mar. 1, 2012

(51) Int. Cl.
*G09G 5/00* (2006.01)

(52) U.S. Cl.
USPC .................................................. 345/8; 345/7

(58) Field of Classification Search
USPC .......................................... 345/1.1, 1.2, 6–8
See application file for complete search history.

(56) References Cited

U.S. PATENT DOCUMENTS

| | | |
|---|---|---|
| 4,711,512 A | 12/1987 | Upatnieks |
| 5,076,664 A | 12/1991 | Migozzi |
| 5,896,232 A | 4/1999 | Budd et al. |
| 6,222,677 B1 | 4/2001 | Budd et al. |
| 6,690,516 B2 | 2/2004 | Aritake et al. |
| 6,738,535 B2 | 5/2004 | Kanevsky et al. |
| 6,747,611 B1 | 6/2004 | Budd et al. |
| 2011/0213664 A1 | 9/2011 | Osterhout et al. |

*Primary Examiner* — Ricardo L Osorio

(74) *Attorney, Agent, or Firm* — Blakely Sokoloff Taylor & Zafman LLP

(57) ABSTRACT

An apparatus that includes a waveguide comprising a front surface, a back surface and an embedded structure between the front surface and the back surface. A reflective array is formed by at least part of the embedded structure. The reflective array includes a plurality of wedges, each wedge having a primary facet, a secondary facet, and a plateau facet wherein at least one of the plurality of primary facets is at least partially reflective. Other implementations are disclosed and claimed.

33 Claims, 5 Drawing Sheets

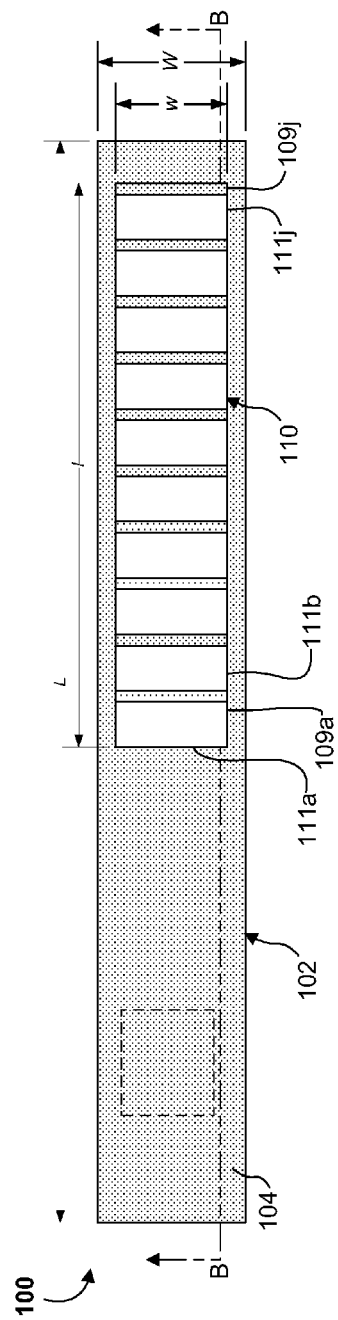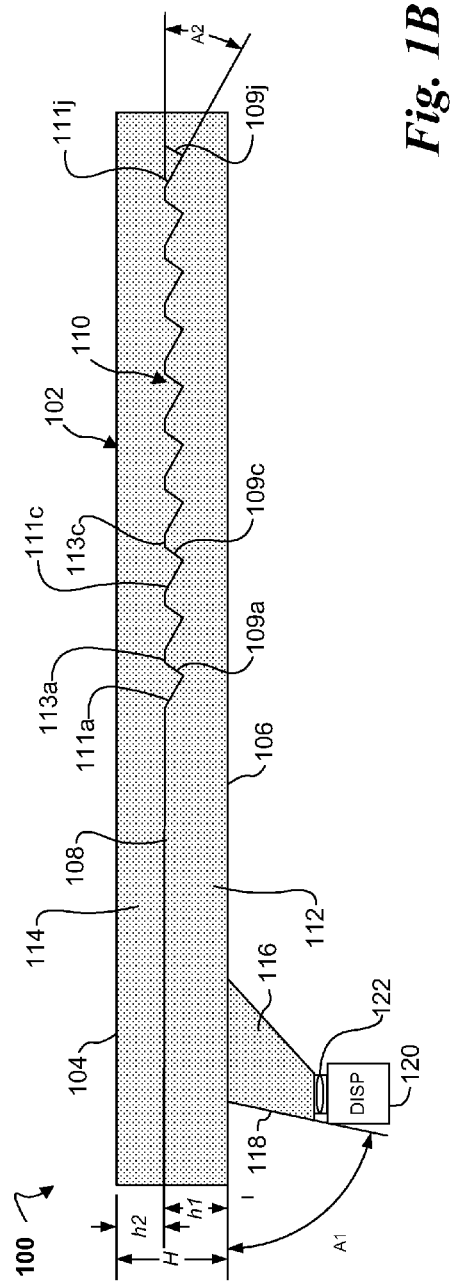

PARTIALLY-REFLECTIVE WAVEGUIDE STACK AND HEADS-UP DISPLAY USING SAME

TECHNICAL FIELD

Embodiments of the present invention relate generally to waveguides and in particular, but not exclusively, to a partially-reflective waveguide stack and a heads-up display using the waveguide stack.

BACKGROUND

Heads-up displays allow a user to view a scene while relevant information is overlaid on the scene, so that the user looking through the heads-up display simultaneously sees both the scene and the relevant information. For example, a pilot looking through a heads-up display while landing an airplane simultaneously sees the airport ahead (the scene) through the heads-up display while the heads-up display projects information such as speed, heading and altitude (the relevant information) that the pilot needs to land the plane.

One problem associated with heads-up displays is how to direct an image from a display to the user's eye with reasonable field of view (FOV) and eyebox. In displays with a large FOV and eyebox, the thickness of the optics quickly become on the order of a few centimeters instead of a few millimeters, making it difficult or impossible to integrate them in sleek, lightweight form factors such as a monocle or eyeglasses.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1A is a top view of an embodiment of a heads-up display.

FIG. 1B is a side sectional view of the embodiment of a heads-up display shown in FIG. 1A, taken substantially along section line B-B.

DETAILED DESCRIPTION OF THE ILLUSTRATED EMBODIMENTS

Figure 2:
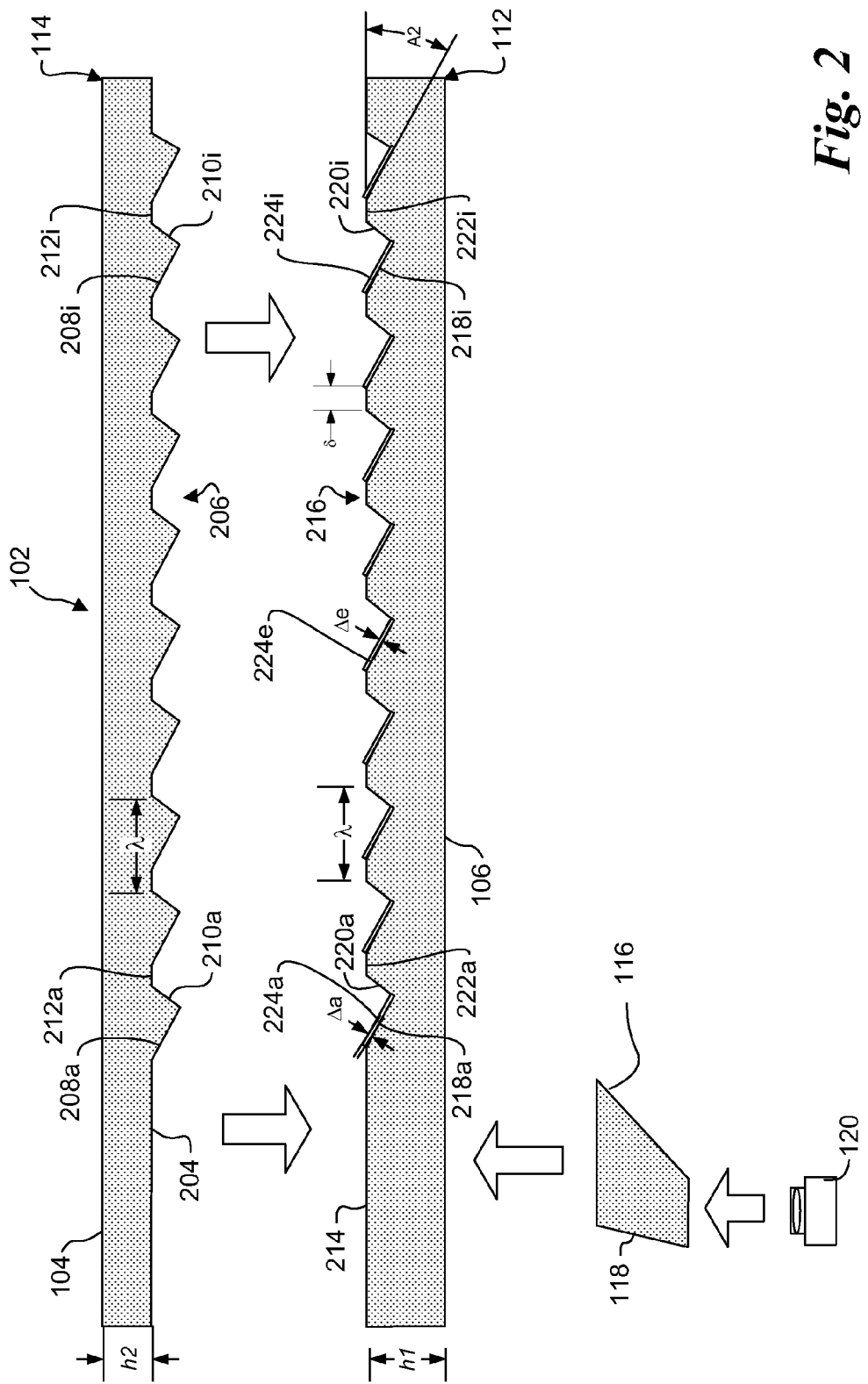
FIG. 2 is a side sectional view of an embodiment of a process for assembling the embodiment of a heads-up display shown in FIGS. 1A-1B.

Embodiments of an apparatus, system and method for a partially-reflective waveguide stack and a heads-up display using the waveguide stack are described. Numerous specific details are described to provide a thorough understanding of embodiments of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

FIGS. 1A-1B illustrate an embodiment of a heads-up display 100. Display 100 includes an array of embedded partially-reflective mirrors integrated with an optical waveguide that directs an image from an optical source such as a display unit to a user's eye, where the array may be optimized to remove null spots within the FOV over the eyebox.

Display 100 includes a waveguide 102 having a front surface 104 and a back surface 106. A launch prism 116 is optically coupled to back surface 106 of the waveguide, and a display unit 120 is optically coupled to launch prism 116. Waveguide 102 has an overall length L and an overall width W, both of which can be adjusted depending on the application in which the waveguide is used.

Waveguide 102 has an overall height H and includes two mating parts: primary waveguide 112 and complementary waveguide 114. Primary waveguide 112 has a nominal height h1, while complementary waveguide 114 has a nominal height h2. In different embodiments, the overall height H of the waveguide, as well as the nominal heights h1 and h2 of the primary and complementary waveguides, can be adjusted depending on the application. Waveguide 102 can be made of a material that is optically transparent in the wavelength range of interest and meets other application requirements such as rigidity, durability, scratch resistance, etc. In one embodiment, both primary waveguide 112 and complementary waveguide 114 can be made of an optical grade acrylic, but in other embodiments other materials can be used, for example polycarbonate. In still other embodiments primary waveguide 112 and complementary waveguide 114 need not be made of the same material, provided the refractive indices of the materials are matched.

Formed within waveguide 102 is an embedded structure positioned between front surface 104 and a back surface 106, where primary waveguide 112 mates with complementary waveguide 114. The intermediate structure includes a substantially planar region 108 and a reflective array 110 with length l and width w. In the illustrated embodiment length l is less than the overall length L of the waveguide and reflective array width w is less than the waveguide width W, but in other embodiments the length and width of the reflective array can be varied. For example, in one embodiment the width w of the grating can be substantially equal to the width W of the waveguide. Similarly, in other embodiments the length l of the grating can be a smaller or larger proportion of the overall length L of the waveguide than in the embodiment shown.

Reflective array 110 includes a plurality of wedges; each wedge is a ridge with a wedge-shaped cross section. Each wedge includes primary facet 111 that is at least partially reflective, a substantially transmissive (i.e., non-reflective) secondary facet 109, and a substantially transmissive (i.e., non-reflective) plateau facet 113 with lengthwise dimension 8 (see FIG. 2). In the illustrated embodiment reflective array 110 includes ten primary facets 111a-111j, ten secondary facets 109a-109j, and ten plateau facets 113a-113j, but in different embodiments reflective array 110 can have different numbers of facets. In the illustrated embodiment, primary facets 111 are positioned at an angle A2 relative to planar portion 108 of the intermediate structure. In one embodiment the wedges are spaced apart at a distance λ, of 1.8 mm (see FIG. 2), have a width w of 22 mm, an angle A2 of 30 degrees, a secondary facet angle of 57.5 degrees, and a plateau facet dimension δ of 0.43 mm. An embodiment with the listed dimensions allows for a 15 degree FOV and 5×10 mm eyebox in a waveguide with a thickness H of about 1.5 mm. Further details of reflective array 110 are discussed below in connection with FIGS. 2A-2B.

Launch prism 116 is optically coupled to waveguide 102 via back surface 106, as well as being optically coupled to display unit 120. By being optically coupled to both waveguide 102 and display unit 120, the launch prism allows display light from display unit 120 to be injected into the waveguide. Launch prism 116 is generally trapezoidal and includes a reflective face 118 that is positioned at an angle A1 relative to back surface 106. In one embodiment angle A1 can be substantially 60°, but in other embodiments other prism shapes can be used and angle A1 can have a different value Generally, angle A1 will have a functional relationship with angle A2, for example by being its complement. As with waveguide 102, launch prism 116 can be made of a material that is optically transparent in the wavelength range of interest and meets other application requirements. In one embodiment launch prism 116 can have a refractive index substantially the same as the refractive index of waveguide 102, so that launch prism 116 and waveguide 102 are index matched.

Display unit 120 is optically coupled to launch prism 116. In the illustrated embodiment the display unit is coupled to the launch prism using an optical element 122 that can condition the display light before launching it into launch prism 116, for example by collimating it. In other embodiments, however, optical element 122 need not be present. When present, optical element 122 can be a refractive, reflective or diffractive optical element, or any combination thereof. In one embodiment, display unit 120 can be a liquid-crystal-on-silicon (LCOS) display, but in other embodiments other types of displays can be used.

FIG. 2 illustrates an embodiment of a process for manufacturing heads-up display 100. Waveguide 102 includes primary waveguide 112 and complementary waveguide 114.

Primary waveguide 112 has nominal thickness h1 and includes back surface 106 and a mating surface that includes a planar portion 214 and an array portion 216. Array portion 216 includes a plurality of wedges in a pattern that is complementary to the pattern of wedges in array portion 206, so that the wedges in array portion 206 will mesh with the corresponding wedges in array portion 216 when mated.

In primary waveguide 112, the primary facets 218 of array portion 216 are at least partially reflective and are positioned at an angle A2 relative to the substantially plane mating surface 214. Secondary facets 220 and plateau facets 222 are substantially transmissive (i.e., non-reflective). In one embodiment, all primary facets 218 can have the same reflectivity, but in other embodiments there can be groups of facets 218 having different reflectivities. For example, in one embodiment a group with five primary facets 218a-218e can have a first reflectivity of about 25% and a group with five primary facets 218f-218j can have a second reflectivity of about 50%, but in other embodiments the reflectivities can be grouped differently and can have values different than those listed. In other embodiments, the reflectivities of primary facets 218 can be distributed over the array according to some functional relationship. For example, in one embodiment primary facet 218a can have the lowest reflectivity, primary facet 218b can have a higher reflectivity, and so on linearly and monotonically until the last primary facet 218j has the highest reflectivity. Other distributions of reflectivity in the array are of course possible in other embodiments.

Each primary facet 218 can be made at least partially reflective using reflective films 224 of thickness Δ, such that primary facet 218a has a reflective film of thickness Δa, primary facet 218b has a reflective film of thickness Δb, and so forth. In one embodiment, the thickness Δ of reflective films 224 can be used to vary the reflectivity of the different primary facets; generally the thinnest reflective coating will result in the lowest reflectivity while the thickest reflective coating will result in the highest reflectivity. In other embodiments, however, other methods can be used to vary the reflectivity of the facets, such as using different reflective films on different primary facets. In addition to reflective films 224, primary facets 218 can also be covered with different or additional coatings, such as a dichroic coating to make reflective array 110 wavelength-selective.

Complementary waveguide 114 has a nominal thickness h2 and includes front surface 104 spaced apart from a mating surface that includes a planar portion 204 and an array portion 206. Array portion 206 includes a plurality of wedges spaced apart periodically by distance λ. In the illustrated embodiment the wedges are uniformly spaced, meaning that distance λ, is constant, but in other embodiments the wedges need not be uniformly spaced.

Each wedge in array portion 206 includes a primary facet 208, a secondary facet 210, and a substantially flat plateau facet 212 so that in the illustrated grating there are ten primary facets 208a-208j, ten secondary facets 210a-210j, and ten plateau facets 212a-212j. The illustrated embodiment has ten wedges, but other embodiments can have a greater or lesser number of wedges.

Waveguide 102 is completed by joining the mating surfaces of primary waveguide 112 and complementary waveguide 114. When primary waveguide 112 and complementary waveguide 114 are joined, mating surface 204 will be in contact with mating surface 214. Reflective array 110 is formed by the mating surfaces of array portion 206 and array portion 216: when the two array portions are mated, primary facets 208 will be in contact with primary facets 218 and reflective films 224; secondary facets 210 will be in contact with secondary facets 220; and plateau facets 212 will be in contact with plateau facets 222. Primary waveguide 112 and complementary waveguide 114 are held together along the mating surfaces using index-matched optical adhesives that will match the refractive indices of primary waveguide 112 and complementary waveguide 114.

After waveguide 102 is completed, launch prism 116 can be optically coupled to waveguide 102, for example by positioning it and attaching it to back surface 106 using index-matched optical adhesives. Once launch prism 116 has been attached to the outside of waveguide 102, display 120 and optical element 122, if present, can similarly be attached to launch prism 116 using index-matched optical adhesives.

Figure 3:
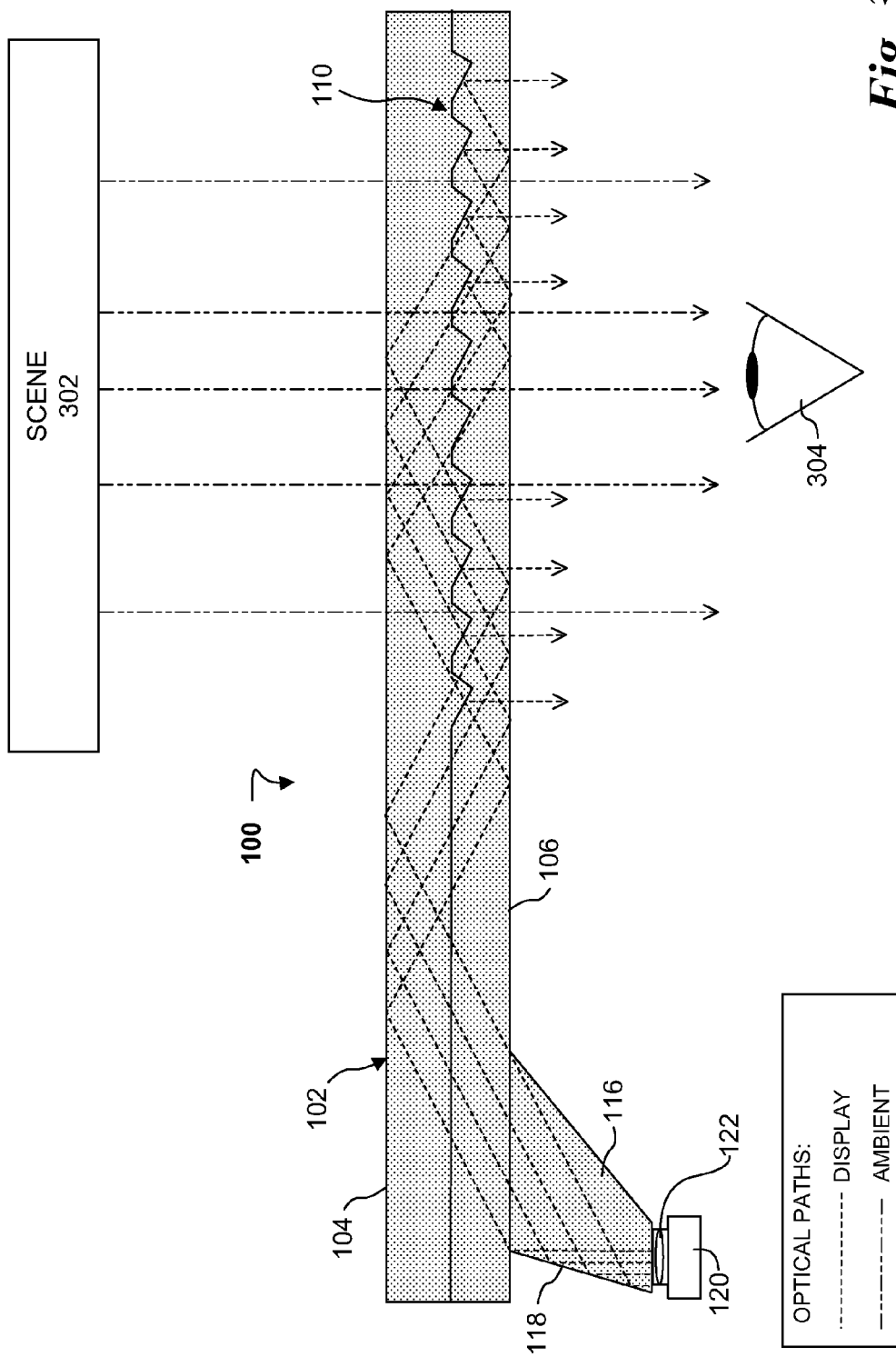
FIG. 3 is a side sectional view of the embodiment of a heads-up display shown in FIGS. 1A-1B, illustrating an embodiment of its operation.

FIG. 3 illustrates an embodiment of the operation of heads-up display 100. During operation, display 100 has two optical paths: a display light path and an ambient light path. The display light path and the ambient light path operate simultaneously to allow user's eye 304 to see information from display 120 projected over scene 302.

The display light path begins at display unit 120, where display light leaves the display unit and is conditioned by optical element 122, if present. After conditioning by optical element 122, the display light is launched into launch prism 116. Some of the light entering launch prism 116 is directed directly into the waveguide 102, while some is incident on reflective face 118, which reflects the display light into the waveguide at an angle that will cause the display light to propagate through the waveguide by total internal reflection. Once in the waveguide, the display light travels through the waveguide by total internal reflection until it reaches reflective array 110.

In reflective array 110, primary facets 111 are at least partially reflective, while secondary facets 109 and plateau facets 113 are substantially non-reflective. When display light transmitted through waveguide 102 reaches reflective array 110, display light rays that are incident on primary facets 111 will be partially reflected toward the users eye because the primary facets are at least partially reflective. That portion of the display light that is incident on a primary facet but is not reflected toward user's eye 304 will continue to propagate through waveguide 102 until it either exits the end of the waveguide or encounters another primary facet that will reflect more of it toward the user's eye. Display light that is incident on secondary facets 109 or plateau facets 113 will continue to propagate through waveguide 102 because the secondary facets and plateau facets are substantially non-reflective and allow the display light to pass through substantially without modification. Light that travels through the secondary facets or plateau facets will continue to propagate through the waveguide until it either exits the waveguide or encounters a primary facet that reflects some of it toward the user's eye.

The ambient light path begins at scene 302, where ambient light from scene 302 is directed toward front surface 104. Light from scene 302 enters waveguide 102 through front surface 104 and encounter reflective array 110. Primary facets 111 are at least partially reflective, meaning that ambient light rays that are incident on a primary facet will be partially reflected and partially propagated; the portion of ambient light that propagates through a primary facet 111 will continue through the waveguide until it exits through back surface 106 and proceeds to user's eye 304. Secondary facets 109 and plateau facets 113 are transmissive (i.e., non-reflective), meaning that ambient light from scene 302 that is incident on a secondary facet 109 or plateau facet 113 will simply propagate through the facet. After propagating through a secondary facet or plateau facet, the ambient light exits waveguide 102 through back surface 106 and is directed toward user's eye 304.

Figure 4:
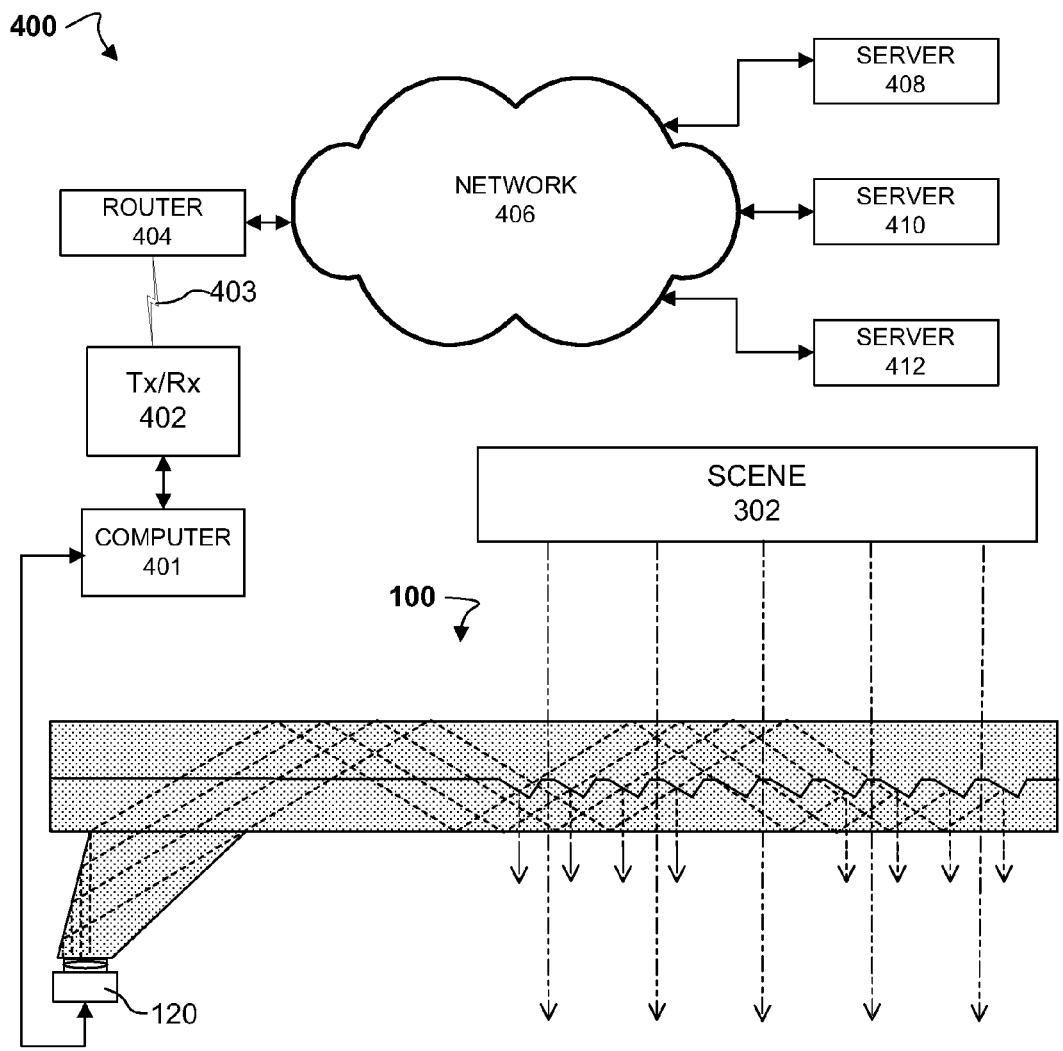
FIG. 4 is a block diagram of an embodiment of a system using a heads-up display such as the one shown in FIGS. 1A-1B.

FIG. 4 illustrates an embodiment of a system 400 including a display 100. In system 400 display unit 120 is communicatively coupled via a computer 401 to a transceiver 402 that can both receive (Rx) and transmit (Tx) data. Some embodiments of system 400 can include a secondary camera (not shown) positioned in, on or near the display and coupled to computer 401 to capture an image of scene 302. Computer 401 can include a general-purpose processor or an application-specific integrated circuit (ASIC), as well as memory, storage and any software or programming needed for its operation, such as an operating system, applications, databases and so forth. Computer 401 can also include additional hardware, such as a GPS unit that can provide the user's location.

Transceiver 402 is coupled to computer 401 as well as being coupled via a communication link 403 to a communication element such as a router 404; in the illustrated embodiment transceiver 402 and router 403 are coupled via a wireless link, but in other embodiments they could be coupled by other types of communication link such as electrical wire, optical fiber, free-space optics, etc. Router 404 is in turn coupled via a network 406 to one or more servers such as servers 408-412, but in other embodiments router 404 could be directly coupled to one or more servers without the need for an intervening network.

In operation of system 400, display 100 functions as previously described: user's eye 304 simultaneously sees ambient light from scene 302 and display light from display unit 120. Computer 401 is coupled to display unit 120 and sends data to the display unit so that it can be directed through waveguide 102 to user's eye 304. In an embodiment with a secondary camera that captures images of scene 302, computer 401 can use the images, as well as additional data such as the user's location established via GPS, for example, to provide information to the user about scene 302.

In one embodiment of system 400, all processing can be done locally by computer 401, while in another embodiment some or all the image processing, data retrieval, etc., can be done remotely by servers 408-412. In yet another embodiment, the data processing can be done by some combination of computer 401 and servers 408-412. In an embodiment where all processing is done locally by computer 401, the computer need not have any access to external computers, so that all image analysis, data retrieval, etc. is done locally by computer 401. Such an embodiment could reduce latency and enhance system response by reducing the need for network communication with other components. In an embodiment with local processing and a secondary camera that captures images of scene 302, computer 401 can use images of scene 302 and additional data, such as the user's location established via GPS, for example, to determine relevant information about the scene. Having determined relevant information about the scene, computer 401 can send the relevant information to display unit 120.

An embodiment in which all processing is done remotely, or in which processing is done with a combination of local and remote processing functions similarly, except that computer 401 can exchange data with servers 408-412 via transceiver 402, communication link 403, router 404, and network 406.

Figure 5:
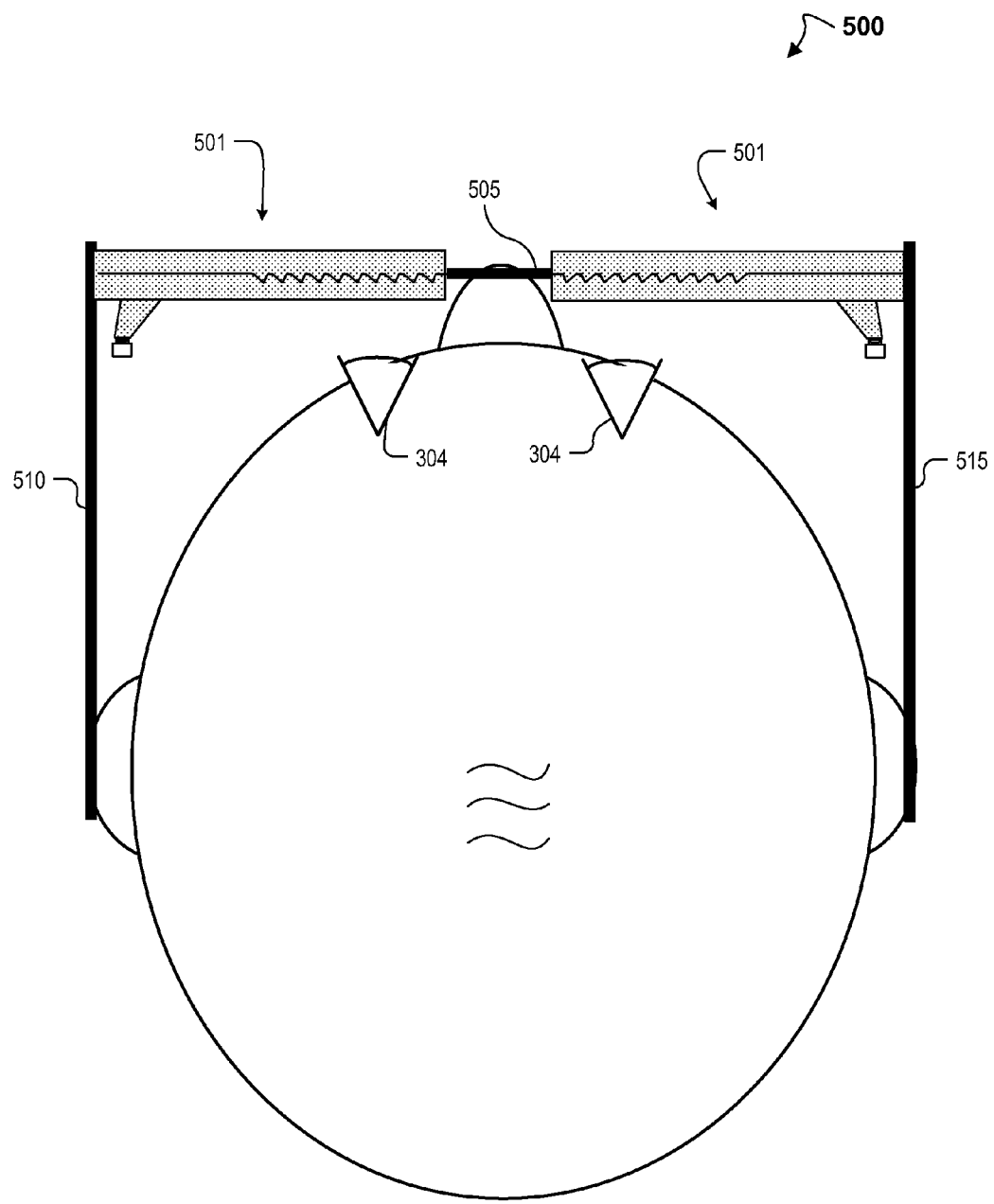
FIG. 5 is a top-view cross-sectional drawing of an embodiment of a heads-up display.

FIG. 5 illustrates an embodiment of a heads-up display 500 implemented as a pair of eyeglasses in which the eyeglass lens functions as the light guide. Heads-up display 500 includes a pair of eyepieces 501, each of which can be heads-up display 100 or can be all or part of a system such as system 500. Eyepieces 501 are mounted to a frame assembly, which includes a nose bridge 505, a left ear arm 510, and a right ear arm 515. Although the figure illustrates a binocular embodiment (two eyepieces), heads-up display 500 can also be implemented as a monocular (one eyepiece) embodiment.

Eyepieces 501 are secured into an eyeglass arrangement that can be worn on a user's head. Left and right ear arms 510 and 515 rest over the user's ears while nose assembly 505 rests over the user's nose. The frame assembly is shaped and sized to position the reflective array 110 in front of a corresponding eye 304 of the user. Of course, other frame assemblies having other shapes may be used (e.g., a visor with ear arms and a nose bridge support, a single contiguous headset member, a headband, or goggles type eyewear, etc.).

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
 a waveguide comprising a front surface, a back surface and an embedded structure between the front surface and the back surface; and
 a reflective array formed by at least part of the embedded structure, the reflective array comprising a plurality of wedges, each wedge having a primary facet, a secondary facet, and a plateau facet wherein at least one of the plurality of primary facets is at least partially reflective.

2. The apparatus of claim 1, further comprising a launch prism optically coupled to the waveguide via the back surface.

3. The apparatus of claim 2, further comprising a display unit optically coupled to the launch prism.

4. The apparatus of claim 3 wherein the launch prism includes a reflective face positioned at an angle relative to the back surface.

5. The apparatus of claim 4 wherein the angle of the reflective face is a complement of the angle of the primary facets.

6. The apparatus of claim 1 wherein the waveguide comprises:
 a primary waveguide having a first mating surface; and
 a complementary waveguide having a second mating surface complementary to the first mating surface, wherein the embedded structure is formed by mating the first mating surface to the second mating surface.

7. The apparatus of claim 6, further comprising an index-matched optical adhesive between the first mating surface and the second mating surface.

8. The apparatus of claim 1 wherein one or more of the primary facets includes a dichroic coating.

9. The apparatus of claim 1 wherein the plurality of primary facets includes a first group of primary facets having a first reflectivity and a second group of primary facets having a second reflectivity.

10. The apparatus of claim 7 wherein the first group and the second group each include two or more adjacent primary facets.

11. The apparatus of claim 1 wherein the reflectivities of primary facets increase monotonically from the side of the reflective array closest to the launch prism to the side of the reflective array farthest from the launch prism.

12. The apparatus of claim 1 wherein the primary facets are formed at an angle relative to a plane in which the embedded structure is formed.

13. A system comprising:
 one or more displays, each display comprising:
  a waveguide comprising a front surface, a back surface and an embedded structure between the front surface and the back surface,
  a reflective array formed by at least part of the embedded structure, the reflective array comprising a plurality of wedges, each wedge having a primary facet, a secondary facet and a plateau facet wherein at least one of the plurality of primary facets is at least partially reflective,
  a launch prism optically coupled to the waveguide via the back surface, and
  a display unit optically coupled to the launch prism; and
 a computer coupled to the display unit.

14. The system of claim 13 wherein the launch prism includes a reflective face positioned at an angle relative to the back surface.

15. The system of claim 14 wherein the angle of the reflective face is a complement of the angle of the primary facets.

16. The system of claim 13 wherein the waveguide comprises:
 a primary waveguide having a first mating surface; and
 a complementary waveguide having a second mating surface complementary to the first mating surface, wherein the embedded structure is formed by mating the first mating surface to the second mating surface.

17. The system of claim 16, further comprising an index-matched optical adhesive between the first mating surface and the second mating surface.

18. The system of claim 13 wherein one or more of the primary facets includes a dichroic coating.

19. The system of claim 13 wherein the plurality of primary facets includes a first group of primary facets having a first reflectivity and a second group of primary facets having a second reflectivity.

20. The system of claim 19 wherein the first group and the second group each include two or more adjacent primary facets.

21. The system of claim 13 wherein the reflectivities of primary facets increase monotonically from the side of the reflective array closest to the launch prism to the side of the reflective array farthest from the launch prism.

22. The system of claim 13 wherein the primary facets are formed at an angle relative to a plane in which the embedded structure is formed.

23. The system of claim 13, further comprising a network communicatively coupled to the computer.

24. The system of claim 23, further comprising one or more servers coupled to the network.

25. The system of claim 24 wherein the one or more servers can transmit information about the scene to the computer.

26. The system of claim 13 wherein the one or more displays are mounted in a pair of eyeglass frames.

27. A process comprising:
 directing display light into a waveguide, the waveguide comprising:
  a front surface, a back surface and an embedded structure between the front surface and the back surface, and
  a reflective array formed by at least part of the embedded structure, the reflective array comprising a plurality of wedges, each wedge having a primary facet, a secondary facet, and a plateau facet wherein at least one of the plurality of primary facets is at least partially reflective;
 propagating the display light through the waveguide to the reflective array;
 reflecting the display light out of the waveguide to a user's eye; and
 simultaneously directing ambient light from a scene to the user's eye through the reflective array.

28. The process of claim 27, further comprising launching the display light into the waveguide via a launch prism optically coupled to the waveguide via the back surface.

29. The process of claim 27 wherein the waveguide comprises:
 a primary waveguide having a first mating surface; and
 a complementary waveguide having a second mating surface complementary to the first mating surface, wherein the embedded structure is formed by mating the first mating surface to the second mating surface.

30. The process of claim 27 wherein one or more of the primary facets includes a dichroic coating so that the display light can be reflected to the user's eye in a wavelength-selective way.

31. The process of claim 27 wherein the plurality of primary facets includes a first group of primary facets having a first reflectivity and a second group of primary facets having a second reflectivity.

32. The process of claim 31 wherein the first group and the second group each include two or more adjacent primary facets.

33. The process of claim 27 wherein the reflectivities of primary facets increase monotonically from the side of the reflective array closest to the launch prism to the side of the reflective array farthest from the launch prism.

* * * * *